(12) United States Patent
Jones

(10) Patent No.: US 8,253,773 B2
(45) Date of Patent: Aug. 28, 2012

(54) VIDEO CAMERA UTILIZING SUBSCRIBER-BASED NETWORKS

(76) Inventor: Randall Scott Jones, Owensboro, KY (US)

( * ) Notice: Subject to any disclaimer, the term of this patent is extended or adjusted under 35 U.S.C. 154(b) by 1253 days.

(21) Appl. No.: 12/019,226

(22) Filed: Jan. 24, 2008

(65) Prior Publication Data

US 2009/0191913 A1  Jul. 30, 2009

(51) Int. Cl.
*H04R 7/14* (2006.01)

(52) U.S. Cl. .................... 348/14.02; 348/14.04

(58) Field of Classification Search .... 348/14.01–14.06; 370/260–271; 379/201.01, 202.01
See application file for complete search history.

(56) References Cited

U.S. PATENT DOCUMENTS

| | | | | |
|---|---|---|---|---|
| 5,389,965 A | * | 2/1995 | Kuzma | 348/14.05 |
| 5,836,055 A | * | 11/1998 | Cooper | 24/339 |
| 2006/0215016 A1 | * | 9/2006 | Cohen et al. | 348/14.12 |

* cited by examiner

*Primary Examiner* — Brian Ensey
(74) *Attorney, Agent, or Firm* — Clements Bernard PLLC; Gregory N. Clements

(57) ABSTRACT

The present invention includes a video camera system configured to provide real-time video streams over subscriber-based networks. The video camera system includes a network camera with a built-in web server, a cellular modem/Ethernet gateway, and a power supply. The video camera system can operate over any subscriber-based network, such as AT&T, Verizon Wireless, Sprint Nextel, T-Mobile, and the like.

20 Claims, 4 Drawing Sheets

VIDEO CAMERA UTILIZING SUBSCRIBER-BASED NETWORKS

FIELD OF THE INVENTION

The present invention relates generally to wireless video cameras. More specifically, the present invention provides a video camera system configured to provide real-time video over subscriber-based networks, such as wireless phone-based networks.

BACKGROUND OF THE INVENTION

Currently, wireless video cameras exist with a variety of access mediums, such as over wireless networks (IEEE 802.11), integrated with mobile phones, etc. However, there are currently no stand-alone devices operable to provide real-time video over subscriber-based networks. Subscriber-based networks include mobile phone and data networks, such as available from AT&T, Verizon Wireless, Sprint Nextel, and the like. These subscriber-based networks offer data access, but the speeds often are significantly less than traditional land-line access, such as through digital subscriber loop (DSL) and cable modem technology.

For example, AT&T utilizes Enhanced Data rates for Global System for Mobile communications (GSM) Environment (EDGE) or Enhanced General Packet Radio Service (EGPRS), which is a digital mobile phone technology that allows increased data transmission rates and improved data transmission reliability. Generally, EDGE and EGPRS provide upload transmission rates of several hundred kilobytes per second. These relatively low transmission rates have made real-time video over subscriber-based networks challenging. For example, conventional video cameras provide real-time video streams in the megabits per second range.

Conventionally, these subscriber-based networks offer video cameras integrated with mobile phones. Additionally, sharing of video clips and pictures is enabled based on uploading media and sharing with other users. The video offered from mobile devices is typically compressed or of a lower quality to fit within the bandwidth framework of the subscriber-based network. However, stand-alone subscriber-based video devices for real-time video over these subscriber-based networks do not currently exist.

Existing wireless-based cameras exist for WiFi access (IEEE 802.11) and wired network access. However, these cameras are not enabled to work directly over subscriber-based networks. For example, default refresh rates of conventional network cameras are too fast for cellular bandwidth. Additionally, these conventional network cameras require configuration to connect to a subscriber-based network.

Mobile technology has been expanding with the introduction of advanced hand-set devices, such as the IPhone from Apple. These devices function not only as a mobile phone, but as a fully integrated web-enable device. It would be advantageous to complement these advanced hand-set devices with a stand-alone video camera system.

SUMMARY OF THE INVENTION

In various exemplary embodiments, the present invention includes a video camera system configured to provide real-time video streams over subscriber-based networks. The video camera system includes a network camera with a built-in web server, a cellular modem/Ethernet gateway, and a power supply. The video camera system can operate over any subscriber-based network, such as AT&T, Verizon Wireless, Sprint Nextel, T-Mobile, and the like.

In an exemplary embodiment of the present invention, a video camera system utilizing a subscriber-based network includes a network video camera including an adjustable broadcast rate, wherein the adjustable broadcast rate is set responsive to bandwidth on the subscriber-based network, a cellular modem configured to connect to the subscriber-based network; and a gateway including a public side connection connected to the cellular modem and a private side connection connected to the network video camera. The cellular modem configured to connect to the subscriber-based network includes a bandwidth plan from the subscriber-based network; wherein the bandwidth plan includes a static Internet Protocol address; and wherein the network camera further includes a web server configured to connect over the Internet. Port forwarding is configured on the gateway to bridge the public side connection to the private side connection; and wherein the web server is configured to receive video requests based on the port forwarding and to provide video from the network video camera over the Internet. The gateway further includes one or more connections on the private side connection; wherein the port forwarding is configured on the private side connection connected to the network video camera; and wherein the one or more connections are configured to connect to Ethernet devices. The video camera system further includes a power supply connected to the network video camera, the cellular modem, and the gateway. Optionally, the power supply includes a battery, and the video camera system can include a solar panel configured to recharge the battery. Alternatively, the cellular modem and the gateway are integrated with a single module. The subscriber-based network includes one of AT&T, Sprint, Verizon, and T-Mobile. Optionally, the video camera system further includes a case, wherein the network video camera, the cellular modem, the gateway, and the battery are located in the case.

In another exemplary embodiment of the present invention a method for utilizing a video camera over a subscriber-based network includes establishing a subscriber-based network plan for a cellular modem/gateway; adjusting a refresh rate of a network camera responsive to bandwidth of the subscriber-based network plan; connecting the cellular modem/gateway to the subscriber-based network; connecting the network camera to the cellular modem/gateway; and receiving a static Internet Protocol address from the subscriber-based network. The method further includes configuring port forwarding on the cellular modem/gateway to enable the network camera to transmit on the static Internet Protocol address. The method further includes accessing the network camera over the Internet based on the static Internet Protocol address. The method further includes assigning a domain name server name to the static Internet Protocol address.

In yet another exemplary embodiment of the present invention, an integrated video camera system utilizing a subscriber-based network includes a network video camera including an adjustable broadcast rate, wherein the adjustable broadcast rate is set responsive to bandwidth on the subscriber-based network; a cellular modem/gateway configured to connect to the subscriber-based network, wherein the gateway includes a public side connection and a private side connection comprising one or more network ports, wherein the public side connection is connected based on a static Internet Protocol address to the Internet through the subscriber-based network, wherein the one of the one or more network ports is connected to the network video camera, and wherein the one of the one or more network ports is configured with port forwarding; and a power supply connected to the network video camera and the cellular modem/gateway. Optionally, the power supply includes a battery and a solar panel configured to recharge the battery. Optionally, the subscriber-based network includes one of AT&T, Sprint, Verizon, and T-Mobile. Optionally, an Internet-enabled device is configured to receive video over a web connection from the integrated video camera system. Alternatively, the integrated video camera system further includes a case, wherein the network video camera, cellular modem/gateway, and the battery are located in the case.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention includes a video camera system configured to provide real-time video streams over subscriber-based networks. The video camera system includes a network camera with a built-in web server, a cellular modem/Ethernet gateway, and a power supply. The video camera system can operate over any subscriber-based network, such as AT&T, Verizon Wireless, Sprint Nextel, T-Mobile, and the like.

Figure 1:
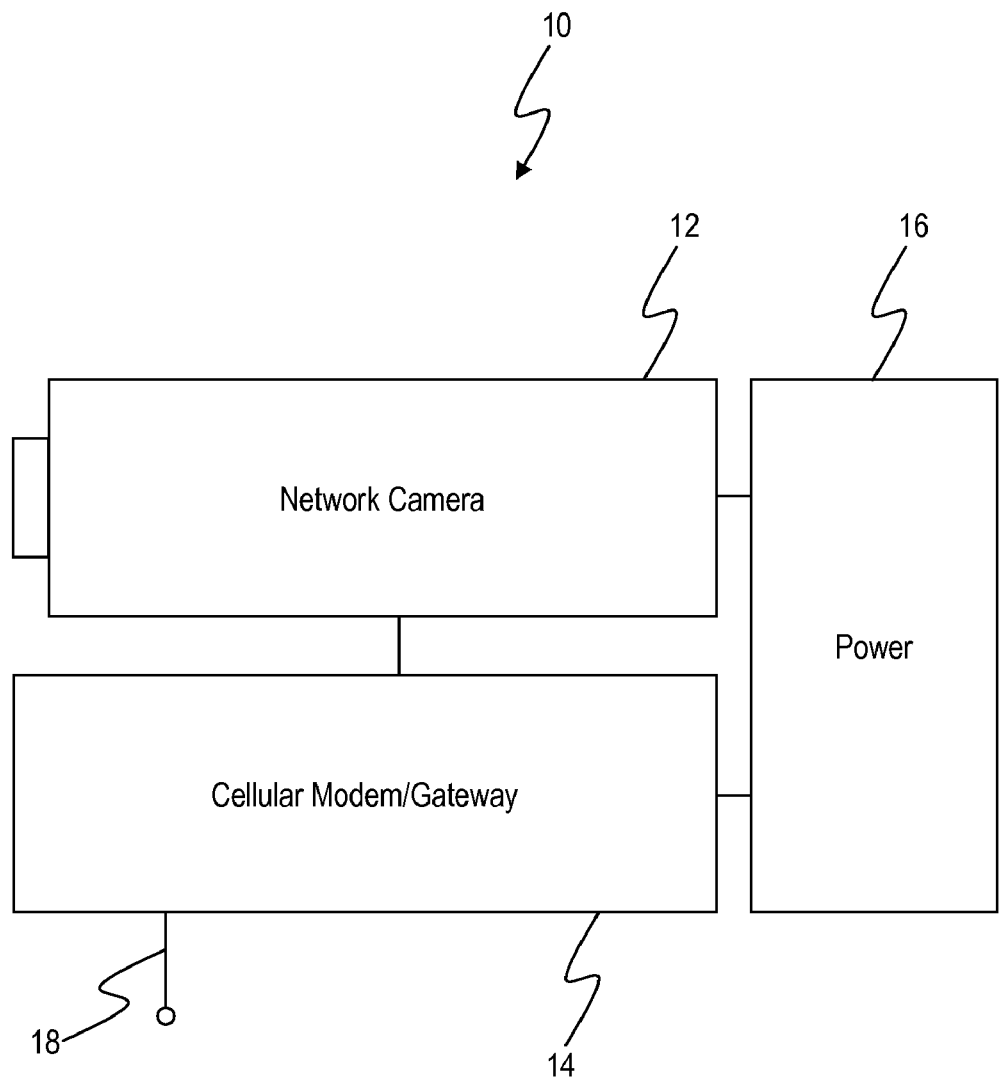
FIG. 1 is a block diagram of a video camera system configured to operate over subscriber-based networks according to an exemplary embodiment of the present invention.

Referring to FIG. 1, a block diagram illustrates a video camera system 10 configured to operate over subscriber-based networks according to an exemplary embodiment of the present invention. The video camera system 10 includes a network camera 12, a cellular modem/gateway 14, and a power supply 16. The power supply 16 is configured to provide power to both the network camera 12 and the cellular modem/gateway 14. For example, the power supply 16 can include a battery, an electrical outlet, or the like.

The network camera 12 includes a digital video camera device configured to provide real-time video streams over a network connection, such as an Internet Protocol (IP)-based connection. For example, the network camera 12 can include an Ethernet connection or a wireless local area network (LAN) connection. Additionally, the network camera 12 can also include a built-in web server allowing the real-time video stream to be provided over a standard web, i.e. Hypertext Transfer Protocol (HTTP), to any user with a web browser. A web server is a computer running a computer program that is responsible for accepting HTTP requests from clients, which are known as web browsers, and serving them HTTP responses along with optional data contents, which usually are web pages such as Hypertext Markup Language (HTML) documents and linked objects (images, etc.).

Of note, the network camera 12 is configured to provide video streams at a configurable frames per second rate. The more frames per second, the more bandwidth is required for the video streams from the network camera 12. Standard frames per second rates are significantly greater than currently available bandwidth for data on subscriber-based networks. Accordingly, the video camera system 10 is configured with the network camera 12 set at a frames per second (fps) rate responsive to available bandwidth on the subscriber-based network.

For example, utilizing the network camera 12 at default frames per second rates, the network camera 12 is not capable of transmitting video over subscriber-based networks. The default frames per second rate (also known as default refresh rate) is a measurement of the frequency (rate) at which an imaging device, such as video cameras, film cameras, and motion capture systems, produces unique consecutive images called frames. Frame rate is most often expressed in frames per second (fps), or simply hertz (Hz). The default refresh rate of the network camera 12 is too fast for cellular bandwidth, and without slowing down the refresh rate, pictures do not display correctly on a browser. Only, after slowing down the refresh rate responsive to available bandwidth on the subscriber-based network, do the pictures appear. The network camera 12 is configured with an adjustable refresh rate, and the present invention configures the adjustable refresh rate according to the available cellular bandwidth.

The cellular modem/gateway 14 can include a Subscriber Identity Module (SIM) card. The SIM card is utilized in mobile cellular telephony devices such as mobile computers and mobile phones. SIM cards securely store the service-subscriber key (IMSI) used to identify a subscriber. The SIM card allows users to change mobile devices by simply removing the SIM card from one mobile device and inserting it into another mobile device or broadband telephony device.

In addition to the SIM card, the cellular modem/gateway 14 is configured with a subscriber plan from a subscriber-based network, such as AT&T, Sprint, Verizon, etc. The subscriber plan is set up to provide a static Internet Protocol (IP) address to the cellular modem/gateway 14, such as through the SIM card or other wireless data access mechanisms as are known in the art. The static IP address enables the cellular modem/gateway 14 to use the same IP address every time it connects to the network. The cellular modem/gateway 14 can include a full TCP/IP stack and embedded real-time operating system to allow connected devices and networks to be natively integrated with EP devices, such as the network camera 12.

Static addressing is essential in some infrastructure situations, such as finding the Domain Name Service (DNS) directory host that will translate domain names to numbers (IP addresses). For example, the static IP address enables the cellular modem/gateway 14 to be designated with a domain name, allowing access to the cellular modem/gateway 14 through the domain name instead of the IP address. Accordingly, the cellular modem/gateway 14 component has an "Always On" connection. Once, the cellular modem/gateway 14 goes through a start-up sequence, it connects to the cell tower for the subscriber-based network and stays connected. The "Always On" connection allows the video camera system 10 to continuously provide images over the static IP address.

A gateway component of the cellular modem/gateway 14 includes a public side and a private side connection. The public side has a public static IP address that is exposed to the Internet through the cellular service. Note, this is the same static IP address described above. The private side includes an Ethernet LAN connection and some user-configurable IP addresses that are not exposed. The private side is configured as described herein to enable the network camera 12 to communicate directly over the web server to the Internet. The web server is configured to provide video from the network camera 12 over HTML to a user through the static IP address. Additionally, the gateway component of the cellular modem/gateway can be separated from the cellular modem.

The power supply 16 can include a battery. For example, the power supply 16 can include a 12 VDC battery in an exemplary embodiment. In a remote location or one without available power, the 12VDC battery can be sustained through the use of a solar panel or other power generation mechanisms. Alternatively, the power supply 16 could include an AC outlet adaptor to connect to a standard electrical outlet, a solar panel directly providing power, or the like.

Connections in the video camera system 10 include power connections from the power supply 16 to both the network camera 12 and the cellular modem/gateway 14. The network camera 16 includes a connection to the cellular modem/gateway 14. For example, this connection could include an Ethernet connection, Universal Serial Bus (USB) connection, Firewire connection, or the like. Additionally, the cellular modem/gateway 14 includes a wireless connection 18 to the subscriber-based network. For example, this can include a wireless antenna.

In an exemplary embodiment, the network camera 12 can include an AXIS 2100 Network Camera or an AXIS 211M Network Camera from Axis Communications Inc. of Chelmsford, Mass. The AXIS 2100 Network Camera includes images configurable up to 15 frames per second (fps) and a built-in web-server. The cellular modem/gateway 14 can include a Digi Connect WAN IA (GSM/GPRS) or a Digi WAN 3G (HSDPA) from Digi International of Minnetonka, Minn. The Digi Connect WAN is available for different subscriber-based networks with both GSM and CDMA based-networks, such as for AT&T, Sprint, Verizon, etc. Additionally, the present invention contemplates any standard, off-the-shelf network IP camera and cellular modem/gateway. For example, the network camera 12 can also include an Panasonic BB-HCM531A from Panasonic Corporation of North America of Secaucus, N.J. and the like. The Panasonic BB-HCM531A can support pan and tilt as well as remotely turning video outputs on/off. The present invention contemplates supporting any functionality in the video camera system 10 through the web interface. This could include pan/tilt, zoom, camera power, and the like. For example, the web interface to the network camera 12 can include a user interface configured to allow a user to operate the various functions associated with the network camera 12.

Figure 2:
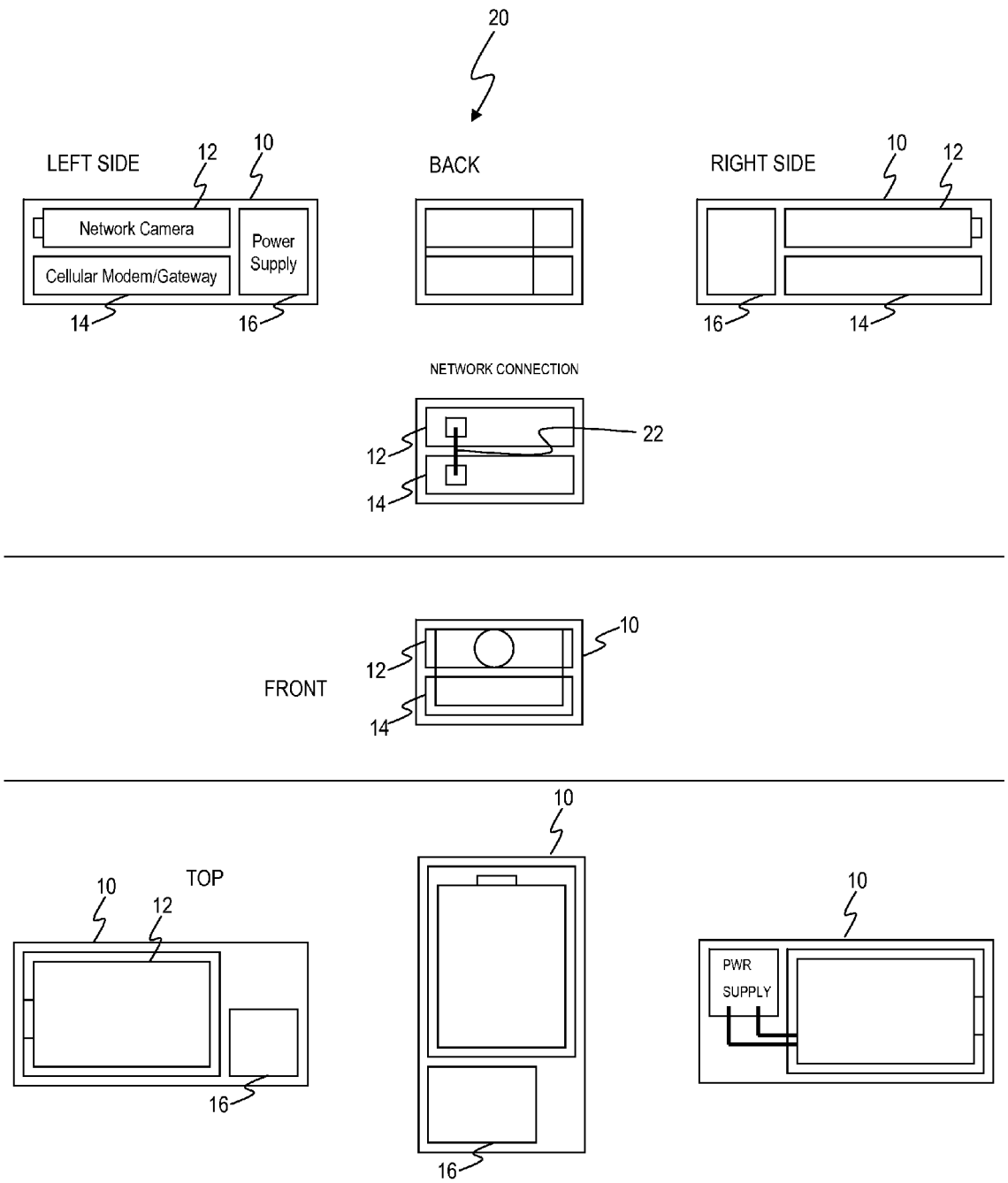
FIG. 2 is a block diagram illustrating packaging of a video camera system according to an exemplary embodiment of the present invention.

Referring to FIG. 2, a block diagram illustrates packaging 20 of a video camera system 10 according to an exemplary embodiment of the present invention. The network camera 12, cellular modem/gateway 14, and power supply 16 can be integrated into the packaging 20 to provide a single, integrated video camera system 10. The packaging 20 provides an integrated and portable video camera system. The packaging 20 can include plastic, metal, or the like, and can be configured to be environmentally hardened to support outdoor placement of the video camera system 10. For example, the video camera system 10 can be placed atop utility poles, on building tops, etc. Advantageously, the portability (e.g., portable packaging, integrated power, no external wiring requirements, etc.) of the video camera system 10 enables the system 10 to be utilized with locations/subjects that are temporary and/or changing in nature.

The packaging 20 can include a rectangular shape. The block diagrams in FIG. 2 illustrate a left side, back, right side, front, and top perspective view of the network camera 12, cellular modem/gateway 14, and power supply 16 integrated within the packaging 20. The packaging 20 includes a network connection 22 between the network camera 12 and the cellular modem/gateway 14 along with power supply connections between the power supply 16 and the network camera 12 and the cellular modem/gateway 14.

Figure 3:
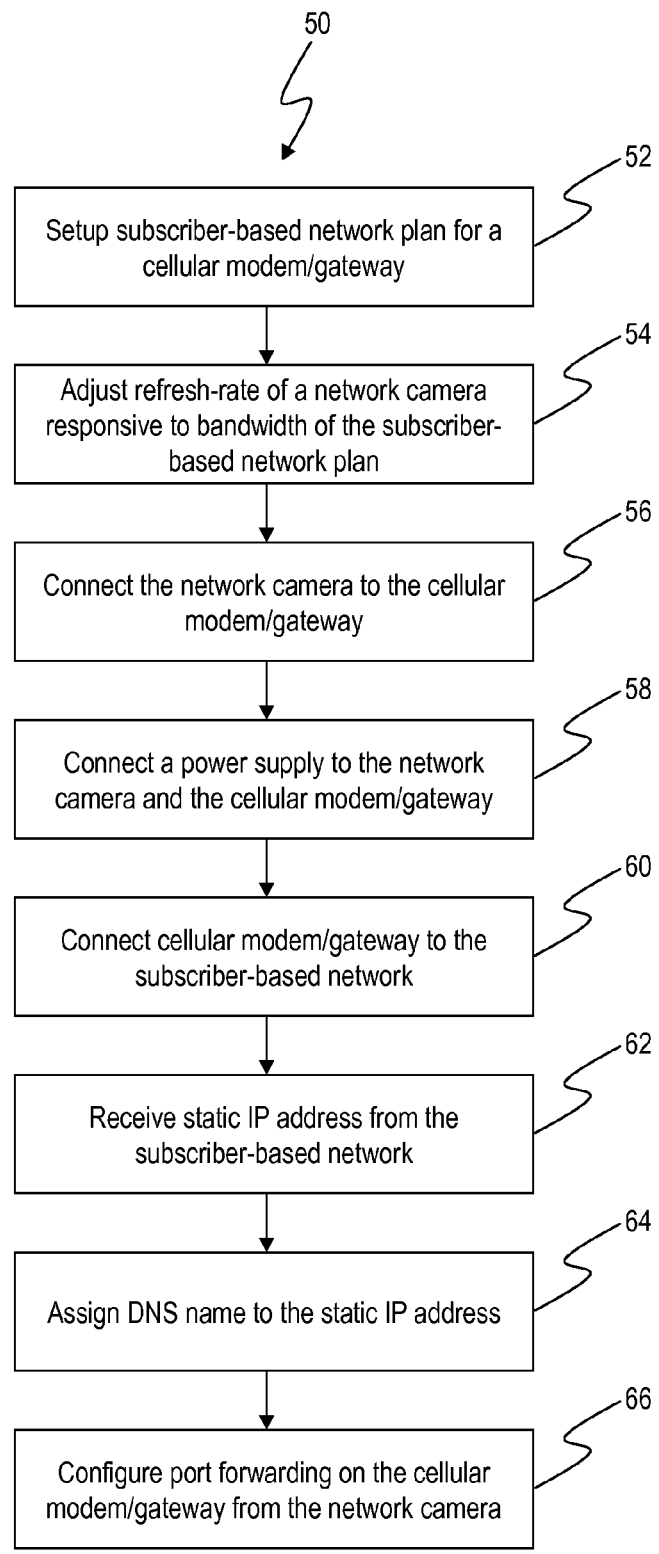
FIG. 3 is a flowchart illustrating setup of a video camera system for a subscriber-based network according to an exemplary embodiment of the present invention.

Referring to FIG. 3, a flowchart illustrates setup 50 of a video camera system for a subscriber-based network according to an exemplary embodiment of the present invention. The setup 50 includes exemplary steps that are required for proper configuration and operation of the video camera system. Note, the exemplary steps could be performed in various orders. Further, these steps could be performed during manufacturing of the video camera system or by a user setting up the system. Additionally, these steps can be automated, such as through software configuration setup tools and the like.

A subscriber-based network plan is setup for a cellular modem/gateway (step 52). Here, a data plan is established for the cellular modem/gateway of the video camera system. The data plan should include a static IP address and a bandwidth rate within the configurable frames per second rate of a network camera. Note, the static IP address can include either an Internet Protocol version 4 (IPv4) or an Internet Protocol version 6 (IPv6) address. Also, the data plan can be changed over time as needed. For example, the cellular modem/gateway could initially be setup with a static IPv4 address through a data plan. When available, the data place could be switched to a static IPv6 address which has a lower cost. Also, the data plan can be flexible based on time needs—temporary, charge by usage, and pre-paid minutes are examples.

The refresh-rate of the network camera is adjusted responsive to the bandwidth of the subscriber-based plan (step 54). Here, the refresh-rate can include a configurable frames per second setting on the network camera. This setting is adjusted based upon the bandwidth of the subscriber-based plan. For example, a slower bandwidth, e.g. hundreds of kilobits per second, corresponds to a lower frames per second setting, and a faster bandwidth, e.g. megabits per second, corresponds to a higher frames per second setting.

The network camera is connected to the cellular modem/gateway (step 56). This connection can include an Ethernet, USB, or similar connection. A power supply is connected to the network camera and the cellular modem/gateway (step 58). The cellular modem/gateway is connected to the subscribed-based network (step 60). A static IP address is received for the cellular modem/gateway from the subscriber-based network (step 62). Optionally, a DNS name can be assigned to the static IP address (step 64). For example, the static IP address can be mapped to a name, such as myvideocamera.com.

Port forwarding is configured on the cellular modem/gateway from the network camera (step 66). Port forwarding is the act of forwarding a network port from one network node to another. This technique can allow an external user to reach a port on a private IP address (inside a LAN) from the outside via a Network Address Translation (NAT)-enabled router. In the present invention, the cellular modem/gateway can include a NAT-enabled router. Port forwarding is key to enable the network camera to communicate directly over the static IP address. Port forwarding is set up to bridge the Public Internet Side of the Network to the Private side of the Network, i.e. the network video camera directly over the Internet.

Figure 4:
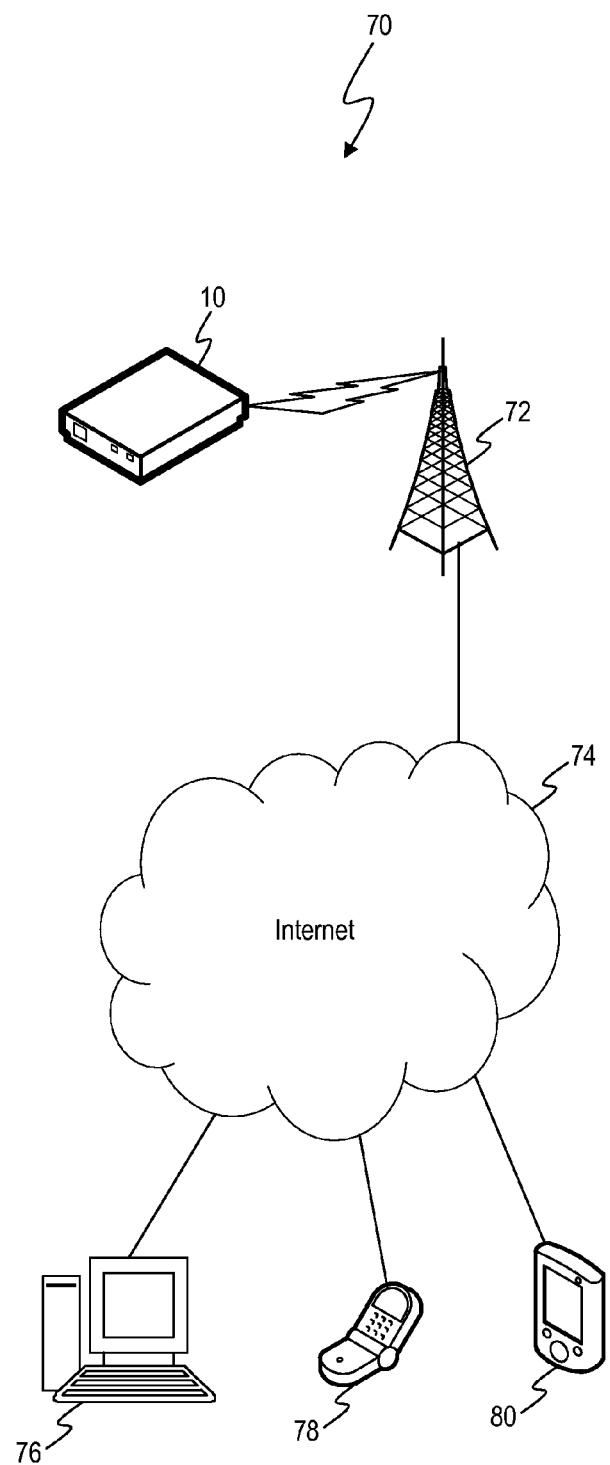
FIG. 4 is a network diagram illustrating use of a video camera system for a subscriber-based network according to an exemplary embodiment of the present invention.

Referring to FIG. 4, a network 70 is shown illustrating a video camera system 10 for a subscriber-based network in operation according to an exemplary embodiment of the present invention. First, the video camera system 10 is setup such as through the setup 50 illustrated in FIG. 3. The setup 50 provides a data plan for a subscriber-based network, a refresh rate for the network camera 12 based on the data plan, and a static IP address for the cellular modem/gateway 14 with port forwarding enabled to the network camera 12.

The video camera system 10 is placed within range of one or more cellular towers 72 of a subscriber-based network. The video camera system 10 is powered up, such as through an on/off switch, providing a power supply, etc. The video camera system 10 is configured to connect to the cellular tower 72 of the subscriber-based network through the cellular modem/gateway 14. This connection utilizes the data plan and connects the video camera system 10 to the Internet 74 based on the static IP address provided by the subscriber-based network.

Once connected to the cellular lower 72, the video camera system 10 utilizes the "always on" connection to provide video from the network camera 12 to the web server associated with the network camera 12. Accordingly, the web server provides video streams via the network connection to the cellular modem/gateway 14. The video can be accessed through the static IP address or an associated DNS name via the Internet 74. The cellular tower 74 provides a continuous wireless connection based on the subscriber-based network.

Once on the Internet 74, the video camera system 10 can be accessed through any device configured to operate over the Internet 74. The video camera system 10 can be accessed over Hypertext Transfer Protocol (HTTP) utilizing the static IP address or DNS name. For example, a personal computer 76 operating a web browser can access the video camera system 10. Also, a mobile phone 78, personal digital assistant (PDA) 80, or the like with Internet 74 access capabilities can also access the video camera system 10.

In an exemplary operation, the video camera system 10 is placed in a remote location to provide remote video monitoring. The system 10 is setup, powered on, and connected to the cellular tower 72. A user with a web browser can access video from the video camera system based upon putting the static IP address or DNS name in the web browser address. Correspondingly, the web browser provides a request through the Internet 74 to the cellular tower 72 to the cellular modem/gateway 14. The cellular modem/gateway 14 utilizes port forwarding to reply to the address with video output at the configured fps rate over HTML back to the web browser.

Advantageously, the video camera system 10 utilizes existing subscriber-based networks for access. This enables usage of the video camera system 10 in remote locations without power and without land-line or WiFi-based Internet 74 access. This enables convenient and cost-effective monitoring for remote locations without requiring infrastructure (wiring, Internet access, power, etc.). Further, subscriber-based networks have improved reliability over traditional wireline Internet access mechanisms, i.e. cellular subscriber-based networks provide increased reliability over WiFi-based networks.

The present invention contemplates a variety of applications for the video camera system 10. For example, the system 10 could be utilized for remote property management, allowing remote video surveillance over the Internet 74. Other applications could include military applications, drug enforcement surveillance (DEA), homeland security, bordering monitoring for the border patrol, construction site monitoring, home surveillance, day care monitoring, security at automated teller machines, payment security at convenience store and gas station gas pumps, mobile applications such as remote assessment, monitoring and advisement related to Fire, Law Enforcement, and Ambulance vehicles, and the like.

Also, the gateway can include a router/switch with multiple network ports in which the network camera is connected. Note, in this case, the port forwarding is enabled based on which port the network camera is connected to. This could also allow other network components to be connected to the video camera system 10. For example, a computer with a network interface card could be connected to the system 10 for network communications. For surveillance applications, the gateway could support telemetry and sensor devices as well through the additional network ports. Also, the gateway could support other functions through these multiple network ports or through the camera as well including remote lock/unlock, remote security alarm control, and the like.

The video camera system described herein does not require any intermediate servers for providing video streams. Rather, it utilizes a network camera with built-in web server and does not require Multimedia Messaging Service (MMS), Short Message Service (SMS), or File Transfer Protocol (FTP) for remote viewing or configuration. All of viewing and configuration functions can be accessed through a standard web browser. Further, the cellular modem/gateway can also support more than one camera based on the number of router/switch ports. This can provide a multi-point video system accessed through multiple browsers.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A video camera system utilizing a subscriber-based network, comprising:
   a network video camera comprising an adjustable broadcast rate, wherein the adjustable broadcast rate is set responsive to bandwidth on the subscriber-based network;
   a cellular modem configured to connect to the subscriber-based network; and
   a gateway comprising a public side connection connected to the cellular modem and a private side connection connected to the network video camera.

2. The video camera system of claim 1, wherein the cellular modem configured to connect to the subscriber-based network comprises a bandwidth plan from the subscriber-based network;
   wherein the bandwidth plan comprises a static Internet Protocol address; and
   wherein the network camera further comprises a web server configured to connect over the Internet.

3. The video camera system of claim 2, wherein port forwarding is configured on the gateway to bridge the public side connection to the private side connection; and
   wherein the web server is configured to receive video requests based on the port forwarding and to provide video from the network video camera over the Internet.

4. The video camera system of claim 3, wherein the gateway further comprises one or more connections on the private side connection;
   wherein the port forwarding is configured on the private side connection connected to the network video camera; and
   wherein die one or more connections are configured to connect to Ethernet devices.

5. The video camera system of claim 1, further comprising a power supply connected to the network video camera, the cellular modem, and the gateway.

6. The video camera system of claim 5, wherein the power supply comprises a battery.

7. The video camera system of claim 6, further comprising a solar panel configured to recharge the battery.

8. The video camera system of claim 6, further comprising a case, wherein the network video camera, the cellular modem, the gateway, and the battery are located in the case.

9. The video camera system of claim 1, wherein the cellular modem and the gateway are integrated with a single module.

10. The video camera system of claim 1, wherein subscriber-based network comprises one of AT&T, Sprint, Verizon, and T-Mobile.

11. A method for utilizing a video camera over a subscriber-based network, comprising:
 establishing a subscriber-based network plan for a cellular modem/gateway;
 adjusting a refresh rate of a network camera responsive to bandwidth of the subscriber-based network plan;
 connecting the cellular modem/gateway to the subscriber-based network;
 connecting the network camera to the cellular modem/gateway; and
 receiving a static Internet Protocol address from the subscriber-based network.

12. The method of claim 11, further comprising configuring port forwarding on the cellular modem/gateway to enable the network camera to transmit on the static Internet Protocol address.

13. The method of claim 12, further comprising accessing the network camera over the Internet based on the static Internet Protocol address.

14. The method of claim 12, further comprising assigning a domain name server name to the static Internet Protocol address.

15. An integrated video camera system utilizing a subscriber-based network, comprising:
 a network video camera comprising an adjustable broadcast rate, wherein the adjustable broadcast rate is set responsive to bandwidth on the subscriber-based network;
 a cellular modem/gateway configured to connect to the subscriber-based network, wherein the gateway comprises a public side connection and a private side connection comprising one or more network ports, wherein the public side connection is connected based on a static Internet Protocol address to the Internet through the subscriber-based network, wherein the one of the one or more network ports is connected to the network video camera, and wherein the one of the one or more network ports is configured with port forwarding; and
 a power supply connected to the network video camera and the cellular modem/gateway.

16. The integrated video camera system of claim 15, wherein the power supply comprises a battery.

17. The integrated video camera system of claim 16, further comprising a solar panel configured to recharge the battery.

18. The integrated video camera system of claim 16, further comprising a case, wherein the network video camera, cellular modem/gateway, and the battery are located in the case.

19. The integrated video camera system of claim 16, wherein subscriber-based network comprises one of AT&T, Sprint, Verizon, and T-Mobile.

20. The integrated video camera system of claim 15, wherein an Internet-enabled device is configured to receive video over a web connection from the integrated video camera system.

* * * * *